No. 881,546. PATENTED MAR. 10, 1908.
C. L. CHISHOLM.
SPEAKING MACHINE.
APPLICATION FILED JAN. 5, 1907.
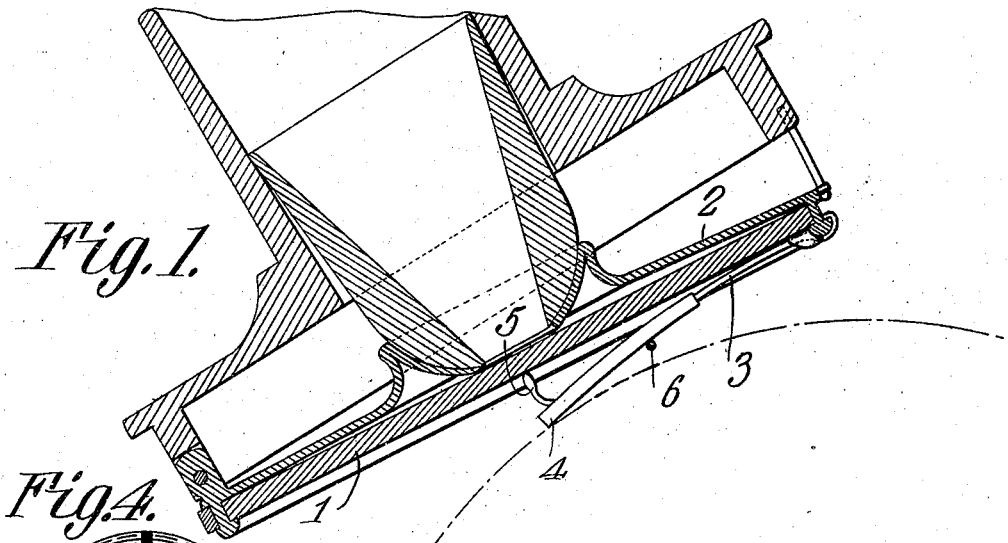
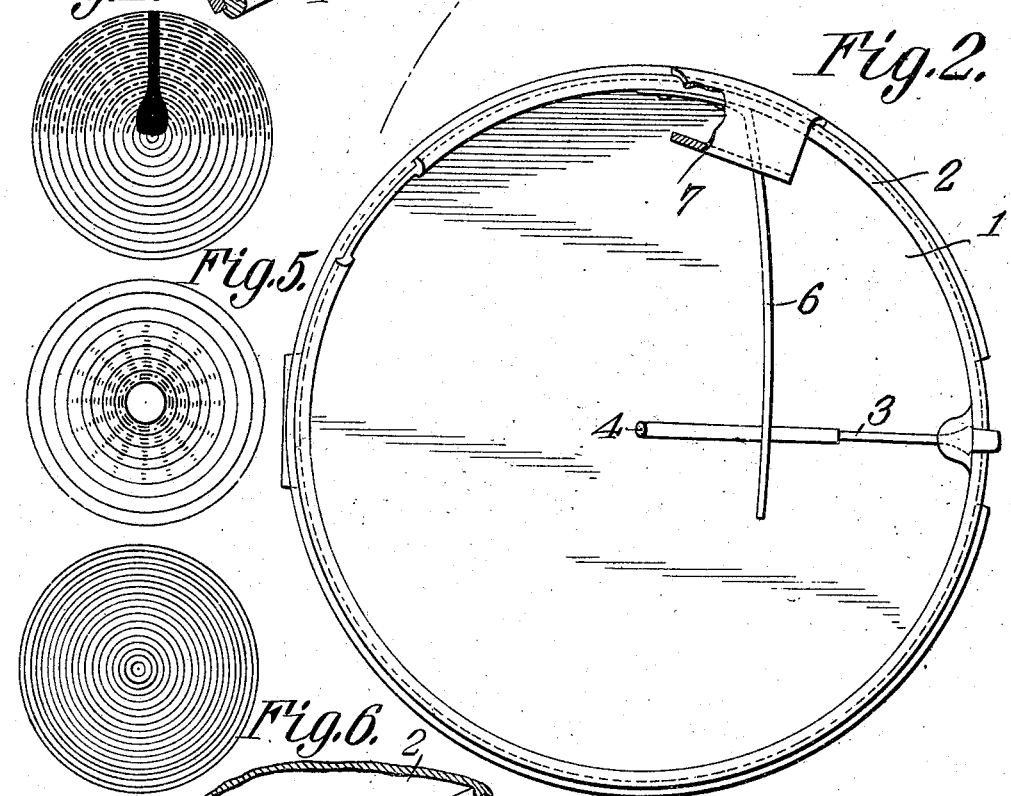
WITNESSES:
E. J. Stewart
C. Bradway.
Charles L. Chisholm,
INVENTOR.
By C. A. Snow & Co.
ATTORNEYS

UNITED STATES PATENT OFFICE.

CHARLES L. CHISHOLM, OF MARYSVILLE, NEW BRUNSWICK, CANADA.

SPEAKING-MACHINE.

No. 881,546.　　　　Specification of Letters Patent.　　　Patented March 10, 1908.

Application filed January 5, 1907. Serial No. 350,979.

*To all whom it may concern:*

Be it known that I, CHARLES L. CHISHOLM, a subject of the King of England, residing at Marysville, New Brunswick, Canada, have invented a new and useful Speaking-Machine, of which the following is a specification.

The invention relates to acoustic instruments, and particularly to recorders and reproducers for phonographs and similar machines, and the object in view is to provide a construction and arrangement of diaphragm and stylus whereby the sound waves or beats affect the diaphragm on truly concentric lines and the stylus receives an accurate vibration in accordance with the sound or sounds attacking the diaphragm to avoid the formation of secondary or false vibrations due to obstacles in the way of a true and accurate and free vibration of the diaphragm, and thus avoid the formation of such a record as in reproduction will result in secondary or false tones or harmonics. To accomplish this it has been found necessary in the first place, as more fully explained hereinafter, to support the diaphragm so that its surfaces are entirely unobstructed and are free to vibrate and to receive the true wave beats of sound without interference, and to construct and arrange the parts so that the center of the diaphragm is as free as any other portion thereof to receive the impulses of the sound waves, the stylus receiving its motion from the accurate center of the diaphragm on a point which is substantially, if not theoretically, what is known as a geometrical point of no appreciable area. Moreover, it has been found that with the extremely thin and sensitive diaphragm ordinarily employed in machines of this type and made necessary by the fact that the attachment of the stylus is accomplished by wings or disks which obstruct and prevent the vibration of the central portion of the diaphragm, and, also, by the attachment of the stylus arm to the surface of the diaphragm from the central point to the periphery thereof, that not only are the vibrations of the diaphragm broken and interfered with, but the secondary or reduced vibrations owing to this flexibility or sensitiveness, produce false tones and harmonics, and the real over tones which are necessary to give character to the fundamental tones reaching the diaphragm are lost or are disposed in opposition to each other, so as to be usually changed in character or nullified.

Therefore, it has been further found that by leaving the diaphragm entirely unobstructed from this central point, which, as above indicated, is of practically no appreciable area to its periphery, a very much thicker and more rigid diaphragm can be employed, and that the over tones can be reproduced and the vibrations accurately and truthfully conveyed to the record so as to be subsequently reproduced.

In addition to the foregoing it has been found that the necessary intimate relation or true contact of the stylus with the center point of the diaphragm can be effected without securing the point of the stylus arm to the diaphragm at such central point, and that depending upon the conditions under which the machine is being used the bearing of the point upon the center of the diaphragm can be varied to produce greater or less tension, and with these and other objects, which will appear as the invention is more fully disclosed, the invention consists in a certain construction, combination and arrangement of parts which will be hereinafter disclosed, it being understood that various changes in the form, proportion, and minor details of construction may be made without departing from the spirit of the invention, which is set forth in the appended claims.

In the accompanying drawings:—Figure 1 is a sectional view of a recorder constructed in accordance with the invention. Fig. 2 is a face view of the same. Fig. 3 is a detail view showing the means for adjusting the spring tension. Figs. 4, 5 and 6 are diagrams of diaphragms showing sound wave formations.

Similar reference characters represent corresponding parts in the several figures of the drawings.

In the illustrated embodiment of the invention, the diaphragm 1, which is from four to ten times the thickness of the diaphragm ordinarily employed in recorders and reproducers, is peripherally supported in the frame or head 2, and the stylus, which, for convenience, may be described as consisting of the stylus arm 3 and the graver or stylus point 4, is attached at the outer extremity of the arm portion to the surface of the diaphragm at, or immediately over the bearing of this diaphragm upon its support, or, in other words, at the dead or non-vibratory portion of the diaphragm. The stylus arm is of yielding spring quality, having a spring tendency toward the diaphragm with its contact point 5 reduced to bear upon the geometrical center of the diaphragm with the minimum area of contact.

In order that the tension of the stylus arm, or the spring tendency thereof toward the diaphragm may be varied, a spring bearing arm 6 is employed, being supported at its outer end at the non-vibratory periphery of the diaphragm, and being adjustable by any suitable means, such as a cam 7, so as to exert a greater or less pressure upon the stylus arm with which it contacts, or over which it extends, and upon which it has a bearing, as indicated in the drawings.

By giving the stylus arm, which at its attached outer end is in a plane substantially parallel with the surface of the diaphragm, an upward sweeping curve, it is possible to position the stylus point at the desired angle with reference to the plane of the surface of the diaphragm, and hence, to the surface of the record or blank, so as to produce the best results, while the bearing point of the arm starting back of the point of the graver or stylus point, extends forward and has its bearing upon the exact center of the diaphragm, and directly beneath the extremity of the stylus point. This insures the accurate transmission of motion of the center of the diaphragm to the stylus point, and hence insures an accurate record. It has been found in practice that the relatively thick or heavy diaphragm instead of being less sensitive to sound waves is more sensitive than the disks of smaller gage or less thickness, owing to the entirely unobstructed areas thereof, there being no attachment of any kind at any point on the surface of the diaphragm within the area of its peripheral support, and the only object in contact with any portion of the surface of the diaphragm being the bearing point of the stylus which, as above indicated, is made of almost unappreciable area. The effect of this construction is that the diaphragm, while responsive to the most sensitive sound waves, does not prolong those waves and thus set up secondary or false vibrations which result in a false record. The rigidity of the diaphragm is such that having received an impulse due to an impinging sound wave, it truthfully answers to the impulse and then returns to its normal position. It has been found that whispers can be accurately recorded and as truthfully reproduced while concerted or orchestra work can be produced with accuracy and without the confusion due to harmonics, all of the more sensitive over tones being accurately recorded, and as accurately reproduced.

In Fig. 4 has been shown a diagram of a diaphragm in which the stylus arm is secured on a radial line extending from the center to the periphery and indicating by the dark broken lines the broken beats resulting from a nodal condition due to the fact that the arm acts as a damper and interferes with the vibrations of that portion of the diaphragm. In that event the undampered portion or half is not free to vibrate as when the diaphragm is entirely unsupported, for the reason that the condition of the dampered portion of the diaphragm serves to obstruct the movement of all parts of the diaphragm.

In Fig. 5 is shown a diagram indicating the effect of covering a portion of the surface of the disk at its center with an attaching device for the stylus, and indicating that not only is the portion of the disk thus covered rendered inert and dead so far as sound production is concerned, but the effect thereof is that of a damper to interfere with the proper formation of the waves in the surrounding portion of the diaphragm.

Fig. 6 illustrates a diaphragm free to vibrate under normal conditions wherein the wave lines are perfectly concentric and extend from the center to the periphery of the diaphragm.

I claim:—

1. In a device of the class described; a rigid, peripherally supported and otherwise superficially unobstructed diaphragm, and a stylus having a bearing upon the center of the diaphragm circumscribed in area to substantially that of a geometric point, said diaphragm being of such thickness as to be undeflected to any appreciable extent from its normal diametric plane by the pressure necessary to maintain the bearing point of the stylus in constant contact with the diaphragm.

2. In a device of the class described; a rigid, peripherally supported and otherwise superficially unobstructed diaphragm, and a stylus in yielding contact but unattached to the center of the diaphragm, with the bearing circumscribed in area to that of a geometric point, the said diaphragm being of a thickness to resist deflection by the pressure necessary to maintain the stylus in unbroken contact with the diaphragm.

3. In a device of the class described; a rigid, peripherally supported and otherwise superficially unobstructed diaphragm; a stylus bearing upon the center of the diaphragm with the area of contact circumscribed to substantially that of a geometric point, the said diaphragm being of a thickness to resist deflection by the pressure necessary to maintain the stylus in unbroken contact with the diaphragm, and a spring arm coöperating with the stylus to establish a yielding contact between the stylus bearing point and the diaphragm.

4. In a device of the class described; a peripherally supported and otherwise superficially unobstructed diaphragm, and a stylus in constant contact with but unattached to the diaphragm at its center, with the area of contact circumscribed to substantially that of a geometric point.

5. In a device of the class described; a peripherally supported and otherwise superficially unobstructed diaphragm; a stylus, and a bearing for the latter in constant contact with but unattached to the diaphragm at its center, said bearing being attached to the stylus back of the stylus point and having its point of contact with the diaphragm in a plane cutting the center of the latter and the graving point of the stylus, and the area of contact between the bearing point and the diaphragm closely approaching a geometric point.

6. In a device of the class described; a peripherally supported and otherwise superficially unobstructed diaphragm; a stylus arm having its supporting end substantially parallel with the surface of the diaphragm and curved away therefrom toward its graving point, and a bearing for the stylus arm having its contact with the diaphragm at the center thereof and of an area closely approaching a geometric point, the said bearing being connected to the stylus arm between the graving end thereof and its supporting end and lying in a plane cutting the center of the diaphragm and the graving point of the stylus.

In testimony that I claim the foregoing as my own, I have hereto affixed my signature in the presence of two witnesses.

CHARLES L. CHISHOLM.

Witnesses:
T. E. HOYLE,
FRANK S. APPLEMAN.